March 25, 1924.
R. ANDRADE LALAMA
TELLTALE COMPASS
Filed Sept. 18, 1920  2 Sheets-Sheet 1
1,488,372
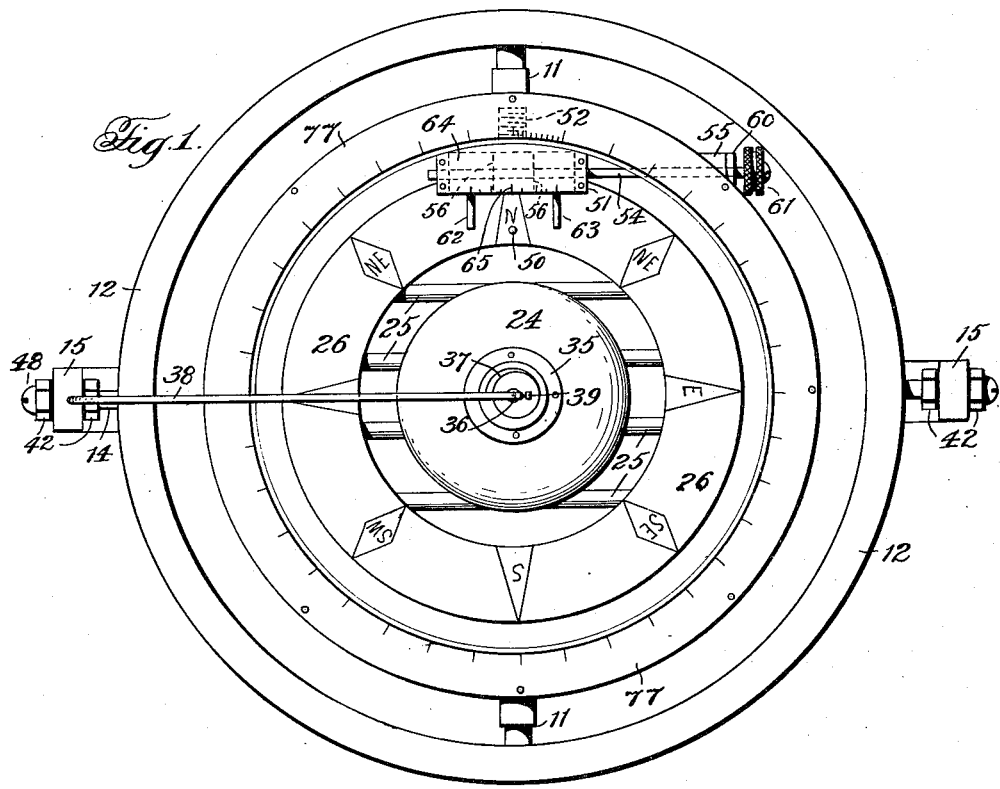
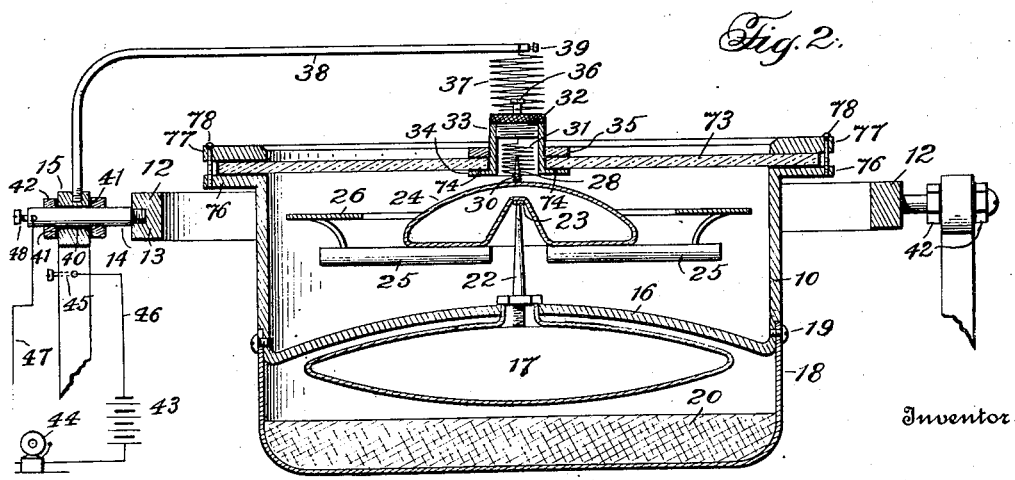
Witness: Jas E Hutchinson
Inventor: Rafael Andrade-Lalama
By Church & Church, Attorneys

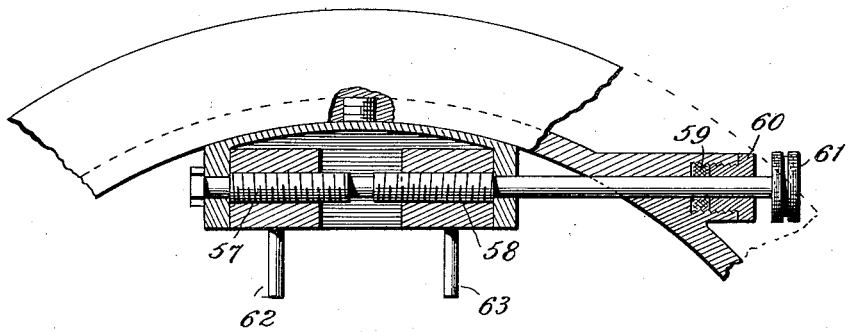
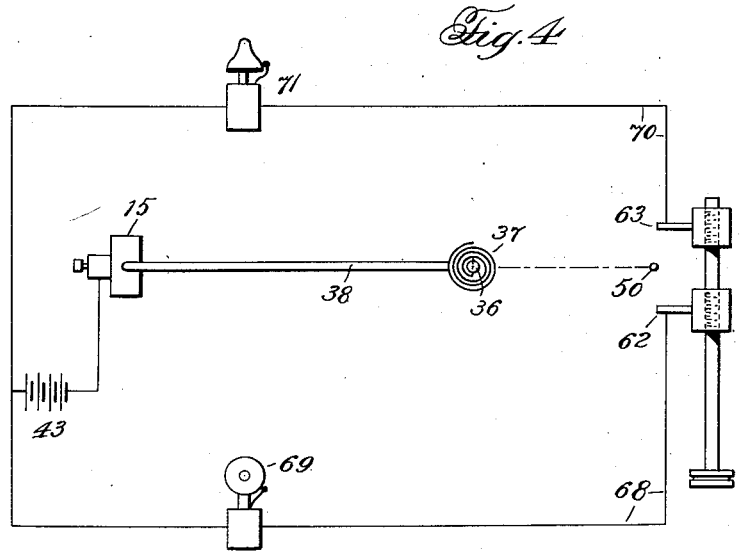

Patented Mar. 25, 1924.

1,488,372

UNITED STATES PATENT OFFICE.

RAFAEL ANDRADE LALAMA, OF QUITO, ECUADOR.

TELLTALE COMPASS.

Application filed September 18, 1920. Serial No. 411,299.

*To all whom it may concern:*

Be it known that I, RAFAEL ANDRADE LALAMA, a citizen of the Republic of Ecuador, residing at Quito, in the Republic of Ecuador, have invented certain new and useful Improvements in Telltale Compasses; and I do hereby declare the following to be a full, clear, and exact description of the same, reference being had to the accompanying drawings, forming part of this specification.

This invention relates to a tell-tale compass intended to give an indication and warning of any material deviation of the ship from the course set by the officer in charge, such warning preferably being an electrical signal located within the office of the chief executive of the ship.

The object of the present invention is to add to a compass of this nature such, for instance, as that shown in Patent No. 1,275,570, granted on August 13, 1918, to Rafael Andrade Lalama, the present applicant, means whereby the drag on the compass card is lessened when the ship is tossing or rolling to a considerable extent. The compass shown in the patent mentioned has proven extremely satisfactory in practice, except for this feature, that when the compass bowl is tilted to a considerable extent, a slight pull is exerted on the compass card which tends to act to oppose the proper rotation of the card and to deaden its movement about its central pivot.

A further object of the invention lies in the provision of means whereby the stop members used in setting the angle of tolerance by which the ship may diverge from the predetermined course, without giving an alarm may be rendered inoperative, so that the compass may be used as an ordinary instrument. In the non-liquid type style of compass, this desirable result can be accomplished by removal of the stop members, but in the liquid type compasses now in general use this is impossible and it was necessary to devise some way in which the stop members could be rendered inoperative and still be immediately available for normal duty when desired.

A still further object of the invention lies in the provision of means to indicate the direction,—starboard or port—of the excess of deviation from the predetermined course.

Referring now to the drawings,—

Figure 1 is a plan view of my device as applied to a liquid compass;

Fig. 2 is a vertical section through the device illustrated in Fig. 1;

Fig. 3 is a fragmentary horizontal section through the mechanism for moving the so-called stop members or contacts; and Fig. 4 is a diagrammatic sketch of the electrical alarm circuit indicating the direction of excess deviation.

In the liquid type the compass card is enclosed in a bowl 10 carrying pivots 11 swinging in the gimbal ring 12 which in turn is provided with bearings 13 receiving pivot points 14 carried in the ends of the yoke 15 which is secured to the box (not shown) in any desired manner, for example, as is illustrated in the patent mentioned. The bowl 10 is filled with any suitable liquid that is a non-conductor of electricity, such as clarified oil, and has a concave bottom 16 which carries the expansion chamber 17. The latter lying within the cap 18 secured to the bowl by means of screws 19 or other fastenings and carrying at its lower portion a weight 20 to maintain the bowl in proper position.

The pin 22 supports the dab 23 which is of agate or precious stone as is usual and carries the float 24 which carries at its lower ends a plurality of magnets 25 above which is supported the compass card 26. The float 24 carries a metal pin 28 which furnishes a convenient contact for one end of the current carrying wire, the connection being made by tightly coiling one end of the wire as at 30 and passing it over the pin 28, the contact being made by friction of the parts. The coil 31 as large in diameter as is convenient and preferably having a considerable number of coils or turns is arranged concentric with the pin 28, and is secured by soldering, welding or otherwise to the center of the underside of a cap 32 threaded to a hollow post 33 having an outwardly extending flange 34 underlying the glass top of the bowl. A ring 35 is threaded to the hollow post 33 and insures a liquid-tight joint between the glass top and the post.

The cap 32 is provided with a central binding post 36 adapted to receive the lower end of a coil of wire 37 suspended from a bracket 38 and secured thereto by means of a screw 39 or other fastening. The bracket 38 is threaded into the end of the yoke or bow 15 which it will be noted is insulated from the bowl 10 and other parts by the sleeve 40 and the insulating disks 41 interposed between the locking nuts 42 which secure the pivot pins 14 in proper place with respect to the gimbal ring 12.

An alarm circuit including a battery 43 or other source of current and an alarm of any preferred nature, such as a buzzer, an electric light, or a bell 44, is connected to the binding post 45 on the yoke 15 by a wire 46 and to the bowl by means of wire 47 leading to the binding post 48 in the gimbal ring pivot 14.

The compass card 26 carries a single upright post 50 preferably of copper or steel electrically connected, by reason of the metal construction of the parts, with the alarm circuit through the float 24, pin 28, coil 31, cap 32, coil 37, bracket 38 and wire 46. A frame or casing 51 provided with a threaded extension 52 by means of which it is secured to the bowl 10 furnishes bearings for a shaft 54 which extends through a neck 55 in the bowl, and also furnishes a sliding and guiding support for two similar threaded blocks 56 which are synchronously moved relatively to the center of the casing by reason of their engagement with the right and left hand threads 57 and 58 on the shaft 54.

Leakage of liquid through the neck 55 is prevented by packing 59 held in place by the thimble 60. A knurled head 61 on the shaft 54 serves to increase or diminish the distance between the two rectangular blocks 56 and consequently the angle through which the upright post 50 on the card can travel without making contact with the stop members or contacts 62 and 63 extending from these blocks. The angle of freedom of the card can be read directly on the upper plate 64 of the casing by means of the graduations 65 so that the permitted deviation from the predetermined course of the vessel may readily be controlled by means of the knurled head 61. It will be understood by those skilled in the art that the compass box is to be installed in the master's room with the lubber line of the box parallel to the keel of the vessel and, that after being set to the proper course and deviation, the box is locked and that when the allowed deviation is exceeded the post on the compass card will contact with one of the stop members, thus closing the alarm circuit and warning the master of the unauthorized change of course of the vessel by the ringing of the bell.

In order that the device may be used as an ordinary compass at will, it is provided with a casing 51 of greater length than would be required for the angle of deviation, and the stop members 62 and 63 are constructed of such length that when the blocks 56 are at their extreme limit of travel the tips of the stop members will be cleared by the post 50 as the card turns, so that no alarm will be given, no matter what the course may be. This construction permits the rendering operative or inoperative of the tell-tale device by the mere turning of the knurled head 61.

If desired, the alarm circuit may be made to indicate the direction of unauthorized deviation by insulating the two stop members from their blocks and connecting each stop member to an individual signal device, these signal devices being connected in parallel to the battery 43. As shown in Fig. 4, the stop member 62 is connected by means of wire 68 to a bell 69 and the stop member 63 is connected similarly by wire 70 to a bell 71 having a different sound from bell 69, and both bells are then connected to the battery 43, so that the sound of the bell will indicate whether the ship has changed her course to the left or to the right of the predetermined course. It will be obvious that different colored lights may replace the bells, or that any other well known signalling apparatus may be used.

The bowl is closed at the top by the sheet of glass 73 centrally perforated to receive of the hollow post 33, which, however, is secured to it and to the cap 32 in a liquid-tight manner, by means of the gaskets 74 about the central perforation and the gasket 75 between the cap and post. The circular glass top 73 rests upon the outwardly extending flange 76 of the bowl and is clamped against the same by means of the annular ring 77, graduated in the usual manner and secured to the bowl by means of the screws 78 extending into the flange 76, thus providing a liquid-tight covering for the bowl.

When the bowl swings about either or both of its pivots the coil 37 will be stretched a slight extent but such stretching of the coil will not affect in any appreciable way the movement of the device on account of its relatively great weight, and since the hollow post, and therefore the coil 31, moves with the bowl and is maintained coaxial with the pin 28, there is no tendency toward dampening the movement of the delicately adjusted compass card no matter how great the pitching and tossing of the ship.

What is claimed is:

1. In a tell-tale compass, a card, stop members adapted normally to limit the movement of said card, means for rendering said stop members inoperative to limit the movement of said card and signal means for indicating that the vessel has departed from the selected bearing to such an extent as to cause the card to reach one limit of its allotted movement.

2. In a tell-tale compass, a card, a contact member carried by said card, stop members adapted normally to limit the movement of said card by engagement with said contact member, means for rendering said stop members inoperative to limit the movement of said card and signal means for indicating that the vessel has departed from the selected bearing to such an extent as to cause the card to reach one limit of its allotted movement.

3. In a tell-tale compass, a card, a pair of stop members, a normally open alarm circuit including a separate alarm member for each stop member, and means carried by said card for closing said circuit through one of said stop members and its alarm on excess deviation of the vessel to one side and through the other stop member and its alarm on deviation of the vessel on the other side.

4. In a mariners' compass of the tell-tale type in which a bowl is carried in gimbal supports, said bowl being provided with a plurality of electrical contacts, and the card of said compass being also provided with a contact adapted to swing between said contacts without touching either of them when the vessel is on its predetermined course, but to contact with same when the vessel deviates from said course by more than a chosen tolerance, and having an alarm circuit one terminal of which is connected to said electrical contacts and the other terminal being connected to the card contact characterized by the provision of a light coil of wire connected to the card and mounted so as to remain co-axial with said card notwithstanding the swinging of the bowl in its supports.

5. In a tell-tale compass, a bowl, a non-conducting liquid filling said bowl, a card pivotally mounted therein, an electrical contact on said card, a plurality of adjustable stop member contacts adapted to limit the movement of said card, a bracket mounted on said bowl and having an upstanding portion directly over the axis of said card, an electrical connection between the upstanding portion of said bracket and said card, including a coil of light wire, an alarm circuit including a source of current, and an alarm connected to said bracket and to the stop member contacts.

6. In a liquid tell-tale compass, a bowl, a compass card pivotally supported therefrom and having an upstanding central vertical pin, a plurality of adjustable electrical contacts on said bowl, a single electrical contact on said card adapted to swing between said contacts when the ship is held to its predetermined course, but to strike against said contacts when the ship leaves said predetermined course by more than a chosen angle of tolerance, a non-conducting liquid within the bowl, an alarm circuit including a source of current, and an alarm electrically connected to the contacts on said bowl and also to the pin on said card, the electrical connection between said alarm and said pin including a coil of wire mounted so as to remain coaxial with said pin during the swinging of the bowl.

7. In a tell-tale compass, a liquid holding bowl, a card pivoted in said bowl and entirely surrounded by the liquid, a contact member carried by said card, a contact member within said bowl, and an alarm circuit connected to each of said contacts and not including the pivotal support for the card.

8. In a tell-tale compass, a bowl filled with non-conducting liquid, a card in said bowl and entirely surrounded by said liquid, a card supporting member, a non-metallic and non-conducting bearing for pivotally supporting said card on said member, a contact member carried by said card, a contact member within said bowl, and an alarm circuit connected to each of said contacts.

9. In a tell-tale compass, a liquid holding bowl, a card in said bowl entirely surrounded by the liquid, a card supporting pin, a jeweled bearing on said card for pivotally supporting said card on said pin, a contact member carried by said card, a contact member within said bowl and an alarm circuit connected to each of said contacts.

10. In a tell-tale compass, a bowl adapted to contain a non-conducting liquid, a card pivoted in said bowl and entirely surrounded by the liquid, a contact member carried by said card, a contact member within said bowl and an alarm circuit having one free end leading to the bowl and the other free end leading to the card contact from a point above the center of the card.

RAFAEL ANDRADE LALAMA.